(12) United States Patent
Suzuki et al.

(10) Patent No.: US 8,308,510 B2
(45) Date of Patent: Nov. 13, 2012

(54) WIRE HARNESS AND METHOD OF MANUFACTURING THE SAME

(75) Inventors: Sachio Suzuki, Hitachi (JP); Hideaki Takehara, Hitachi (JP); Kunihiro Fukuda, Tsukuba (JP); Yuta Kataoka, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 228 days.

(21) Appl. No.: 12/923,532

(22) Filed: Sep. 27, 2010

(65) Prior Publication Data
US 2011/0104943 A1    May 5, 2011

(30) Foreign Application Priority Data
Nov. 4, 2009  (JP) ................. 2009-253329

(51) Int. Cl.
*H01R 13/60* (2006.01)
(52) U.S. Cl. ........................................ 439/587
(58) Field of Classification Search .................. 439/587, 439/589, 604, 274, 275; 29/857, 858, 860
See application file for complete search history.

(56) References Cited

U.S. PATENT DOCUMENTS

| | | | | |
|---|---|---|---|---|
| 4,634,213 A | * | 1/1987 | Larsson et al. | 439/875 |
| 5,569,050 A | * | 10/1996 | Lloyd | 439/465 |
| 6,123,556 A | * | 9/2000 | Asakura et al. | 439/99 |
| 6,250,972 B1 | | 6/2001 | Shinchi et al. | |
| 8,192,230 B2 | * | 6/2012 | Kataoka et al. | 439/604 |

FOREIGN PATENT DOCUMENTS

| | | |
|---|---|---|
| JP | 11-066807 | 3/1999 |
| JP | 2000-048901 | 2/2000 |

* cited by examiner

*Primary Examiner* — Neil Abrams
(74) *Attorney, Agent, or Firm* — McGinn IP Law Group, PLLC

(57) ABSTRACT

A wire harness includes a cable, a connector including an outer housing including a resin, a cable insertion hole into which an end portion of the cable is inserted, and a concave portion formed on an insertion side of the cable insertion hole, and a welding member including a resin to provide air-tightness between the outer housing and the cable by being welded to the outer housing by ultrasonic welding. The welding member is formed around the cable so as to surround the cable while allowing a gap portion to have a predetermined clearance from the cable, and fitted into the concave portion of the outer housing. Melted resin of the welding member is to flow into the gap portion to form an airtight seal about the cable.

7 Claims, 4 Drawing Sheets

| | |
|---|---|
| 1 WIRE HARNESS | 5c BOTTOM WALL |
| 2 CABLE | 21 WELDING MEMBER |
| 3 CONNECTOR | 22 CONVEX PORTION |
| 5 OUTER HOUSING | 23 FLANGE PART |
| 5b CONCAVE PORTION | |

| 2 CABLE |
| --- |
| 21 WELDING MEMBER |
| 22 CONVEX PORTION |
| 23 FLANGE PART |
| 24 GAP PORTION |

| | |
|---|---|
| 1 WIRE HARNESS | 5c BOTTOM WALL |
| 2 CABLE | 21 WELDING MEMBER |
| 3 CONNECTOR | 22 CONVEX PORTION |
| 5 OUTER HOUSING | 23 FLANGE PART |
| 5b CONCAVE PORTION | 24 GAP PORTION |

WIRE HARNESS AND METHOD OF MANUFACTURING THE SAME

The present application is based on Japanese patent application No. 2009-253329 filed on Nov. 4, 2009, the entire contents of which are incorporated herein by reference.

BACKGROUND OF THE INVENTION

1. Field of the Invention

This invention relates to a wire harness that is capable of sufficiently maintaining air-tightness between an outer housing of a connector and a cable, and relates to a method of manufacturing the wire harness.

2. Description of the Related Art

Generally, in a wire harness used for vehicles etc., a connector part thereof is configured to have a water proof structure in order to prevent water or the like from entering into the inside of the connector so as to cause a problem, and an air-tightness maintaining structure for maintaining air-tightness between the outer housing of the connector and the cable is installed between them.

A conventional wire harness 41 shown in FIGS. 4A and 4B uses a wire seal 44 as the air-tightness maintaining structure.

The wire harness 41 is configured to maintain the air-tightness between the outer housing 43 of the connector 46 and the cable 42 by that a wire seal 44 formed of rubber for waterproofing is inserted between the outer housing 43 of the connector 46 and the cable 42, the wire seal 44 is crushed between the outer housing 43 and the cable 42 so that it is brought into close contact with both of the outer housing 43 and the cable 42.

In the outer housing 43, a cable insertion hole 47 into which an end portion of the cable 42 is inserted is formed, and the wire seal 44 is housed in a wire seal housing concave portion 48 formed in an insertion side of the cable insertion hole 47 of the outer housing 43. An opening part of the wire seal housing concave portion 48 is blocked with a tail plate 45 in order to prevent the wire seal 44 from dropping out.

However, in case of using the wire seal 44 for the air-tightness maintaining structure between the outer housing 43 and the cable 42, it is necessary to install the wire seal 44 corresponding to each of the cables 42 and house each of the wire seals 44 in the wire seal housing concave portion 48, so that a distance between the cables is broadened and it becomes difficult to shorten a pitch of the cable 42. In particular, the wire harness for vehicles is required to be downsized, so that there is a need for an air-tightness maintaining structure that is capable of further shortening the pitch of the cable 42.

Then, as shown in FIG. 5A, a wire harness 51 is proposed, that is configured to maintain the air-tightness between the outer housing 53 and the cable 52 by that the cable 52 is sandwiched between the outer housing 53 formed of a resin and a welding member 54 formed of a resin, the welding member 54 is welded to the outer housing 53 due to ultrasonic welding by using a horn 55 (for example, refer to JP-A-2000-48901).

As show in FIG. 5B, the wire harness 51 has a structure obtained by a method that grooves 53a are formed in the outer housing 53 and grooves 54a are formed in the welding member 54 respectively, cables 52 are disposed in the grooves 53a of the outer housing 53 and simultaneously the welding member 54 is stacked from above so as to locate the grooves 54a within positions of the cables 52, and in this condition, the horn 55 is brought into contact with an upper surface of the welding member 54 and is pressed from above down below while the welding member 54 is vibrated, and the welding member 54 is welded to the outer housing 53 due to the ultrasonic welding.

This technique is disclosed in, for example, JP-A-2000-48901 and JP-A-1999-66807.

SUMMARY OF THE INVENTION

However, the above-mentioned wire harness 51 has a problem described below.

In the technique about the ultrasonic welding as disclosed in JP-A-2000-48901, a sheath 52a of a surface part of the cable 52 is also melted, but in this case, it is necessary to study a thickness and a quality of material of the sheath on the assumption that the sheath is melted due to the ultrasonic welding when the sheath of the cable is designed and selected, so that it becomes a restriction at the time of designing a wire harness. In particular, with regard to a thickness of the sheath, it is necessary that the sheath is designed to have a thickness thicker than usual on the assumption that the sheath is melted due to the ultrasonic welding.

Then the inventors et al. has considered a structure obtained by a method that after gaps are formed around the cables when the welding member 54 and the outer housing 53 are stacked each other, contact parts of the welding members 54 in which the welding member 54 and the outer housing 53 are brought into contact with each other (parts surrounded by broken lines in FIG. 5B) are melted due to the ultrasonic welding, and the resin melted (the melt resin) is poured into the peripheries of the cables 52 uniformly.

However, in this method, since when the ultrasonic welding is carried out, the gaps around the cables 52 are also varied, it is unexpectedly difficult to pour the melt resin into the peripheries of the cables 52 uniformly, in other words, there is a high possibility that thicker parts and thinner parts of the melt resin layer are formed in the periphery of the cable 52, so that there is a possibility that the air-tightness becomes insufficient in the thinner parts of the melt resin layer.

Therefore, it is an object of the invention to provide a wire harness that is capable of sufficiently maintaining air-tightness between an outer housing of a connector and a cable, and to provide a method of manufacturing the wire harness.

(1) According to one embodiment of the invention, a wire harness comprises:

a cable;

a connector comprising an outer housing comprising a resin, a cable insertion hole into which an end portion of the cable is inserted, and a concave portion formed on an insertion side of the cable insertion hole; and a welding member comprising a resin to provide air-tightness between the outer housing and the cable by being welded to the outer housing by ultrasonic welding, the welding member being formed around the cable so as to surround the cable while allowing a gap portion to have a predetermined clearance from the cable, and fitted into the concave portion of the outer housing, wherein in a process of the ultrasonic welding, the welding member is fitted into the concave portion of the outer housing, vibrated and simultaneously pressed against a bottom wall side of the concave portion such that a forward end portion of the welding member in contact with the bottom wall side of the concave portion is melted into a melt resin, the melt resin is poured into the gap portion, and a periphery of the cable is covered with the melt resin.

In the above embodiment (1) of the invention, the following modifications and changes can be made.

(i) The welding member further comprises a convex portion to be fitted into the concave portion of the outer housing and a flange part integrally formed on a rear end side of the convex portion to be in contact with a peripheral edge of the concave portion in the process of the ultrasonic welding, and the convex portion is formed longer than a depth of the concave portion of the outer housing.

(ii) The convex portion of the welding member comprises a taper shape that tapers toward the forward end such that an area of the convex portion to be in contact with the bottom wall side of the concave portion of the outer housing is decreased in the process of the ultrasonic welding.

(iii) The flange part is formed to adhere to the cable so as to prevent the melt resin from being leaked from between the flange part and the cable, the convex portion is formed around the cable so as to surround the cable while allowing the gap portion to have the predetermined clearance from the cable, and the convex portion is formed to have such a length that an amount of the melt resin melted by the ultrasonic welding becomes such that the gap portion is perfectly filled and the melt resin poured into the gap portion presses the cable by being pressed in the process of the ultrasonic welding.

(iv) A plurality of cables are included, the convex portion is formed cylindrical and has an inner diameter greater than an outer diameter of the cable and the convex portion is provided for each of the plurality of cables, and the convex portion is formed to share a part thereof with an adjacent convex portion.

(v) The outer housing and the welding member are formed of a same resin material.

(2) According to another embodiment of the invention, a method of manufacturing a wire harness comprising: a cable; a connector comprising an outer housing comprising a resin, a cable insertion hole into which an end portion of the cable is inserted, and a concave portion formed on an insertion side of the cable insertion hole; and a welding member comprising a resin to provide air-tightness between the outer housing and the cable by being welded to the outer housing by ultrasonic welding, the welding member being formed around the cable so as to surround the cable while allowing a gap portion to have a predetermined clearance from the cable, and fitted into the concave portion of the outer housing, the method comprising:

inserting the cable into the welding member;

fitting the welding member into the concave portion of the outer housing; and vibrating the welding member and simultaneously pressing the welding member against a bottom wall side of the concave portion so as to melt into a melt resin a forward end portion of the welding member in contact with the bottom wall side of the concave portion, pour the melt resin into the gap portion, and cover a periphery of the cable with the melt resin.

Points of the Invention

According to one embodiment of the invention, a wire harness is constructed such that a welding member is formed around a cable so as to surround the cable while allowing a gap portion to have a predetermined clearance from the cable, and in the process of the ultrasonic welding, the welding member is fitted into a concave portion of a female outer housing, and the welding member is vibrated and simultaneously pressed against a bottom wall side of the concave portion so that a forward end portion of the welding member to be in contact with the bottom wall of the concave portion is melted into a melt resin, the melt resin is poured into the gap portion, and a periphery of the cable is covered with the melt resin. Thus, the melt resin can be almost uniformly poured into the periphery of the cable, namely, the melt resin layer surrounding the periphery of the cable can be formed so as to have an approximately uniform thickness, and the periphery of the cable is covered with the melt resin with no space, and the female outer housing and the welding member are integrated with each other with no space, so that the air-tightness between the female outer housing and the cable can be sufficiently maintained.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1A:
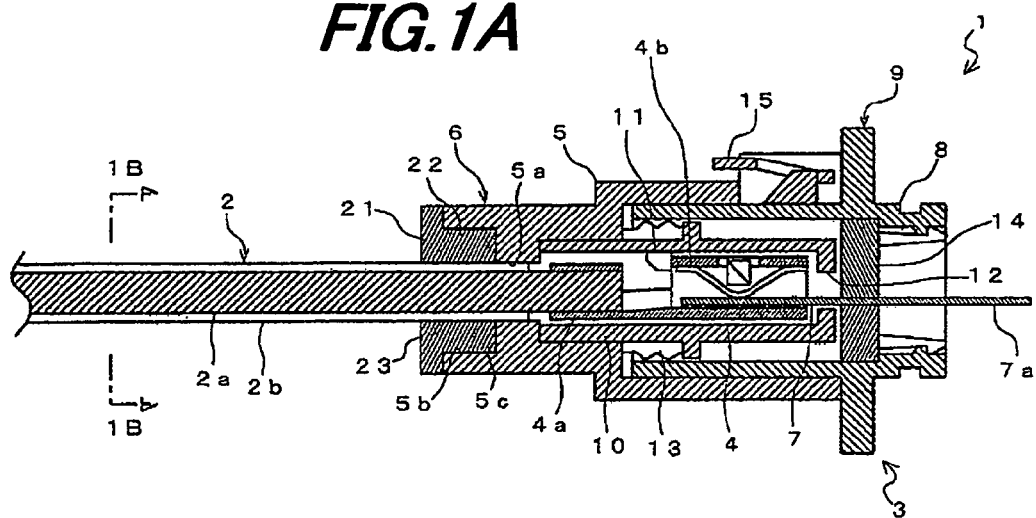
FIG. 1A is a longitudinal cross-sectional view schematically showing a wire harness according to one embodiment of the invention.

The preferred embodiments according to the invention will be explained below referring to the drawings.

Figure 1B:
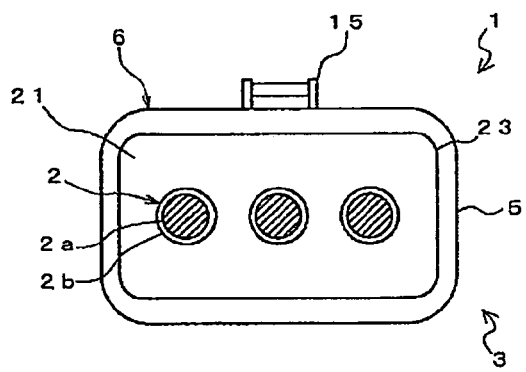
FIG. 1B is a cross-sectional view taken along the line 1B-1B in FIG. 1A.

FIG. 1A is a longitudinal cross-sectional view schematically showing a wire harness according to one embodiment of the invention and FIG. 1B is a cross-sectional view taken along the line 1B-1B in FIG. 1A.

As shown in FIGS. 1A and 1B, a wire harness 1 includes a cable 2 and a connector 3 formed in an end portion of the cable 2.

The wire harness 1 is used for, for example, a connection between a motor and an inverter that drive a hybrid electric vehicle (HEV).

The cable 2 includes a central conductor 2a formed of copper or aluminum, and an insulator, a shield conductor and a sheath 2b that are formed on a periphery of the central conductor 2a in this order. Further, in FIGS. 1A and 1B, the insulator and the shield conductor are not shown in order to simplify the drawings.

The sheath 2b of the cable 2 is formed of, for example, cross-linked polyethylene or the like and is formed to be softened in terms of routing property. In the wire harness 1, three cables 2 are used corresponding to three-phase alternating current, and in an end portion of each cable 2, a female terminal 4 is installed respectively.

The connector 3 includes a female connector 6 that has a female outer housing 5 for housing the female terminal 4 formed in an end portion of the cable 2, and a male connector 9 that has a male outer housing 8 for housing a male terminal 7 to be electrically connected to the female terminal 4.

The female connector 6 includes three (three electrodes) female terminals 4 formed an end portion of each cable 2, the female outer housing 5 for housing the female terminals 4, and a female inner housing 10 for retaining the female terminals 4 in the female outer housing 5. Both of the female outer housing 5 and the female inner housing 10 are formed of an insulation resin.

In the female outer housing 5, a cable insertion hole 5a into which the end portion of the cable 2 is inserted is formed, and in an insertion side (FIG. 1A shows as a left side) of the cable insertion hole 5a, a concave portion 5b into which a welding member 21 described below is inserted is formed.

The female terminal 4 is formed in a shape of an approximately rectangular cylinder on the transverse section view, and has a cable connection part 4a formed in an extension part formed by extending a bottom surface of the female terminal 4, to which the cable 2 is connected. Within the female terminal 4, a sandwich means 4b is installed, for sandwiching the male terminal 7 between the means 4b and the bottom surface of the female terminal 4 while it presses the male terminal 7 to a side of the bottom surface of the female terminal 4 when the male terminal 7 is inserted.

The female terminal 4 is housed in a female terminal box 11 having a box-like shape formed in the female inner housing 10. In a front surface (FIG. 1A shows as a surface of a right side) of the female terminal box 11, a female terminal opening part 12 through which the end portion of the female terminal 4 is viewed is formed. In addition, the female connector 6 includes a seal member 13 for sealing between the female inner housing 10 and the male outer housing 8 when the female outer housing 5 and the male outer housing 8 are fitted to each other.

The male connector 9 includes three (three electrodes) male terminals 7, the male outer housing 8 for housing the male terminals 7, and a male inner housing 14 for retaining the male terminals 7 in the male outer housing 8. Both of the male outer housing 8 and the male inner housing 14 are formed of an insulation resin.

The male terminal 7 is configured to have a forward end portion viewed in the male outer housing 8, and on the other hand, to have a rear end portion connected to a device side male terminal 7a having a plate-like shape, for being connected to a device such as an inverter (actually, the male terminal 7 and the device side male terminal 7a are integrally formed of the same member).

In addition, in both side surfaces of the male outer housing 8, slide axes respectively formed of a protrusion are formed, and in the female outer housing 5, slide grooves for guiding the slide axes are formed, although the axes and the grooves are not shown. In addition, in the female outer housing 5, a rotation lever 15 is rotatably formed, and the rotation lever 15 is rotated in the condition that both of housing 5, 8 are fitted to each other, so that the slide axes inserted into the slide grooves can be locked, and both of the connector 6, 9 can be fitted to each other.

Next, an air-tightness maintaining structure between the female outer housing 5 and the cable 2 that is a characteristic feature of the present invention will be explained.

The wire harness 1 is configured to maintain an air-tightness between female outer housing 5 and the cable 2 by that a welding member 21 formed of a resin is welded to the female outer housing 5 due to ultrasonic welding.

The welding member 21 includes a convex portion 22 for fitting to an concave portion 5b of the female outer housing 5 and a flange part 23 integrally formed with a rear end side (FIG. 1A shows as a left side) of the convex portion 22, for coming into contact with a peripheral edge of the concave portion 5b at the time of the ultrasonic welding.

The welding member 21 is fitted into the concave portion 5b of the female outer housing 5 at the convex portion 22 thereof, and is vibrated and simultaneously pressed to a side of bottom wall 5c of the concave portion 5b so that a forward end portion of the convex portion 22 that comes into contact with the bottom wall 5c of the concave portion 5b is melted, and the welding member 21 is welded to female outer housing 5 due to the ultrasonic welding.

Figure 2A:
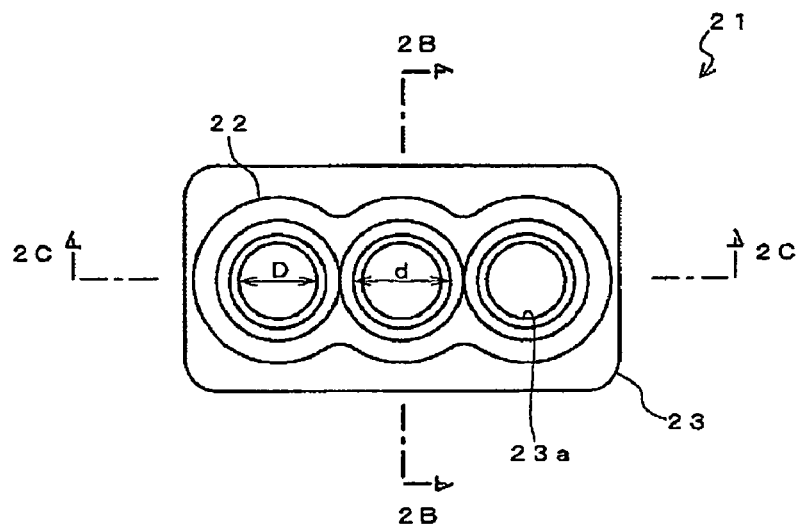
FIG. 2A is a front elevation view schematically showing a welding member used for the wire harness in FIG. 1A.
Figure 2B:
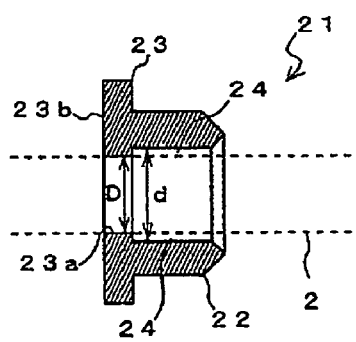
FIG. 2B is a cross-sectional view taken along the line 2B-2B in FIG. 2A.
Figure 2C:
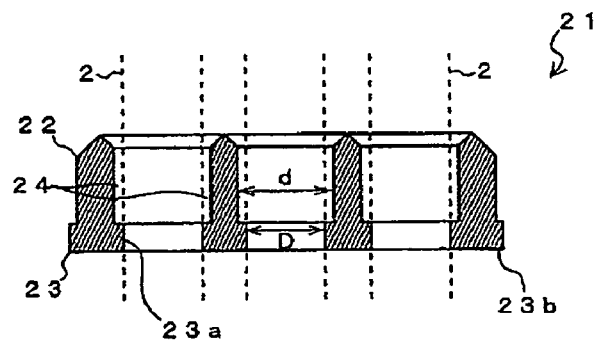
FIG. 2C is a cross-sectional view taken along the line 2C-2C in FIG. 2A.

As shown in FIGS. 2A to 2C, the welding member 21 is formed around the cable 2 so as to surround the cable 2 while it keeps a gap portion 24 having a predetermined width between it and the cable 2. The gap portion 24 is a space into which a melt resin is poured, the melt resin that is the melted welding member 21 when the forward end portion of the convex portion 22 is melted at the time of the ultrasonic welding, and the gap portion 24 is formed to have a width being wide to such an extent that the melt resin can be positively poured.

In the embodiment, the convex portion 22 is formed around the cable 2 so as to surround the cable 2 while it keeps the gap portion 24 having a predetermined width, and the flange part 23 is formed to adhere to the cable 2 so as to prevent the melt resin from being leaked between the flange part 23 and the cable 2 at the time of the ultrasonic welding. Further, the convex portion 22 is formed to adhere to an inner wall of the concave portion 5b at the periphery thereof so as to prevent the melt resin from being leaked between the convex portion 22 and the female outer housing 5 at the time of the ultrasonic welding.

It is preferable that the welding member 21 is formed of the same resin material that the female outer housing 5 in order to obtain sufficient strength by being integrated with the female outer housing 5 due to the ultrasonic welding. The resin material used for the welding member 21 and the female outer housing 5 preferably includes polybutylene terephthalate (PBT), polyphenylene sulfide (PPS), polyamide (PA).

Here, a shape of the welding member 21 will be explained further in detail.

The flange part 23 of the welding member 21 is formed in a plate-like shape, and in the flange part 23, three through holes 23a having a diameter that is approximately equal to an outer diameter of the cable 2 are formed in parallel corresponding to three cables 2. Since a rear end surface 23b (FIG. 2B shows as a surface of a left side) of the flange part 23 is a surface (refer to FIG. 3A) with which a horn 31 comes into contact, it is formed to be flat. The rear end surface 23b of the flange part 23 is formed to have largeness (area) sufficient to ensure a contact area with the horn 31 in order to prevent the flange part 23 from being melted due to generation of heat between the horn 31 and the flange part 23 at the time of the ultrasonic welding.

The convex portion 22 is formed to protrude from one surface (FIG. 2B shows as a surface of a right side) of the flange part 23 perpendicularly. The convex portion 22 is formed in a cylindrical shape concentrically with the through hole 23a, and an inner diameter d thereof is formed to be lager than a diameter D (namely, an outer diameter of the cable 2) of the through hole 23a. Due to this, the convex portion 22 is formed around the cable 2 so as to surround the cable 2 while it keeps a gap portion 24 that is a cylindrical space having a width (d−D).

In addition, the convex portion 22 is formed to have a taper shape that tapers toward the forward end (a forward end tapered shape) so that an area of the convex portion 22 coming into contact with the bottom wall 5c of the concave portion 5b of the female outer housing 5 is decreased at the time of the ultrasonic welding. Due to this, at the time of the ultrasonic welding, vibration is concentrated on the forward end portion of the convex portion 22 so that heat is easily generated between the forward end portion of the convex portion 22 and the bottom wall 5c of the concave portion 5b, and the forward end portion of the convex portion 22 is easily melted. In the embodiment, the forward end portion of the convex portion 22 is formed in a mountain-like shape (a triangular shape) on the cross-section view, so that the area of the convex portion 22 coming into contact with the bottom wall 5c of the concave portion 5b is decreased, and the forward end portion of the convex portion 22 is easily melted at the time of the ultrasonic welding.

The convex portion 22 is formed for each of the three through holes 23a corresponding to three cables 2. The convex portions 22 adjacent to each other are formed to be stacked on each other so as to share a part thereof with each other. This is an idea for setting a distance between the cables 2 as small as possible and shortening a pitch of the cable 2. The convex portion 22 located between the through holes 23a adjacent to each other is configured to have a structure that the forward end portions formed in a mountain-like shape are stacked so as to become one forward end portion formed in a mountain-like shape.

In addition, since a length of the convex portion 22 is shortened than an original length by that the forward end portion is melted at the time of the ultrasonic welding, the convex portion 22 is formed to have a length longer than a depth of the concave portion 5b of the female outer housing 5. It is preferred to set the convex portion so as to have such a length that an amount of the melt resin melted at the ultrasonic welding becomes large to such an extent that the gap portion is perfectly filled and the melt resin poured into the gap portion presses the cable due to pressing force at the time of the ultrasonic welding.

Next, a method of manufacturing the wire harness 1 will be explained.

When the wire harness 1 is manufactured, first, an end portion of the cable 2 is passed through the through hole 23a of the welding member 21 and the cable insertion hole 5a of the female outer housing 5 sequentially, and the female terminal 4 is installed in a terminal of the cable 2. After that, the female terminal 4 is housed in the female terminal box 11 of the female inner housing 10, and the female inner housing 10 is fixed to the female outer housing 5.

After that, the welding member 21 is welded to the female outer housing 5 due to the ultrasonic welding so that the air-tightness maintaining structure for maintaining air-tightness between the cable 2 and the female outer housing 5 is formed.

Figure 3A:
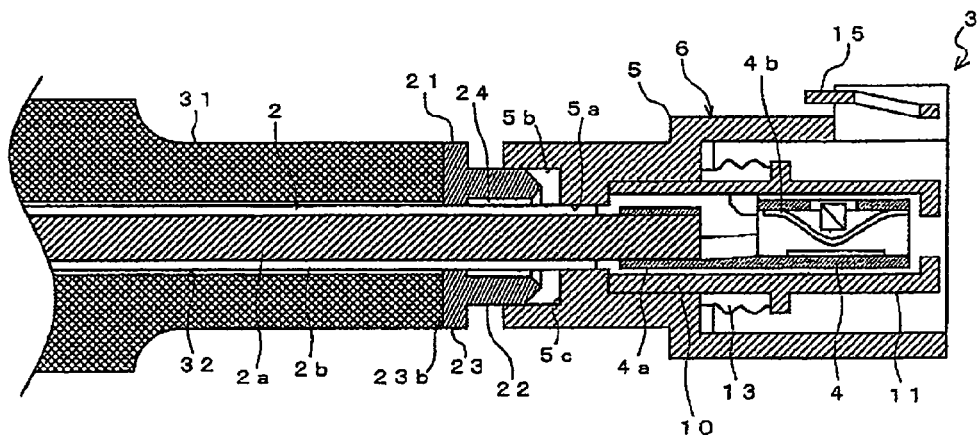
FIGS. 3A and 3B are longitudinal cross-sectional views explanatorily showing a method of manufacturing the wire harness in FIG. 1A.

When the welding member 21 is welded to the female outer housing 5 due to the ultrasonic welding, as shown in FIG. 3A, the convex portion 22 of the welding member 21 is fitted into the concave portion 5b of the female outer housing 5, the horn 31 is brought into contact with the rear end surface 23b of the flange part 23 of the welding member 21, and the welding member 21 is vibrated by the horn 31 and simultaneously pressed to a side of the bottom wall 5c of the concave portion 5b. The embodiment is configured to have a structure that a hole 32 through which the cable 2 is passed is formed in the horn 31, and in the condition that the cable 2 is passed through the hole 32, the welding member 21 is pressed along a direction of an axis of the cable 2. Further, it is preferable that the horn 31 is formed so as to be divisible at the holes 32 vertically.

When the forward end portion of the convex portions 22 of the welding member 21 is brought into contact with the bottom wall 5c of the concave portion 5b, heat is generated between the forward end portion of the convex portion 22 and the bottom wall 5c of the concave portion 5b, so that the forward end portion of the convex portion 22 is melted. Since a peripheral side of the convex portion 22 is adhered to the female outer housing 5, the melt resin formed by that the convex portion 22 is melted is introduced into a side of the cable 2 and poured into the gap portions 24. When the welding member 21 is further vibrated and simultaneously pressed, the forward end portion of the convex portion 22 is melted and poured into the gap portions 24 sequentially and the gap portions 24 are perfectly filled with the melt resin.

In this condition, when the welding member 21 is further vibrated and simultaneously pressed by the horn 31, an inner pressure of the melt resin filled in the gap portions 24 is heightened, so that the melt resin filled in the gap portions 24 presses the sheath 2b of the cable 2. Further, at this time, the flange part 23 comes into contact with the peripheral edge of the concave portion 5b, so that the flange part 23 is also wedged to the female outer housing 5.

Figure 3B:
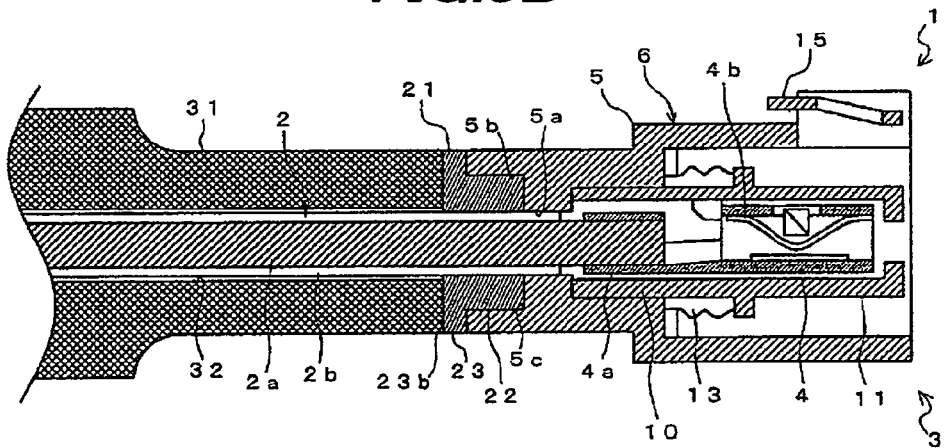
Figure 4A:
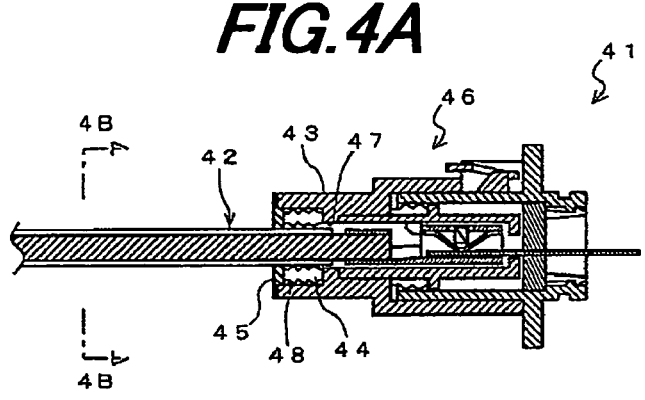
FIG. 4A is a longitudinal cross-sectional view schematically showing a conventional wire harness.
Figure 4B:
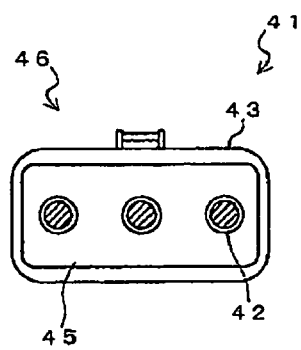
FIG. 4B is a cross-sectional view taken along the line 4B-4B in FIG. 4A.
Figure 5A:
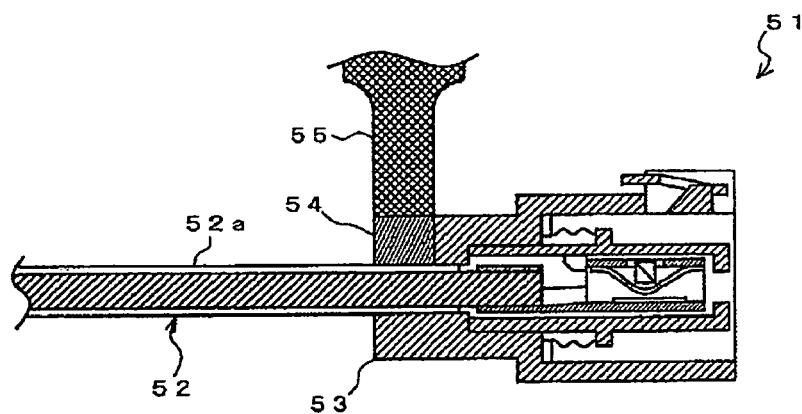
FIG. 5A is a longitudinal cross-sectional view schematically showing a conventional wire harness.
Figure 5B:
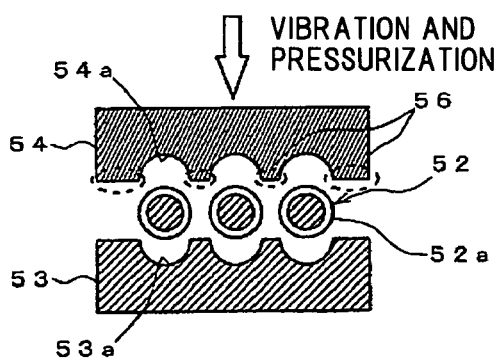
FIG. 5B is an exploded transverse cross-sectional view schematically showing an air-tightness maintaining structure used for the conventional wire harness.

In this condition, when vibration by the horn 31 is stopped, as shown in FIG. 3B, the melt resin that covers a periphery of the cable 2 is solidified, so that the welding member 21 and the cable 2 are adhered to each other with no space between them. In addition, when the melt resin is solidified, the welding member 21 and the female outer housing 5 are integrated with each other.

By the above-mentioned procedure, the air-tightness maintaining structure between the female outer housing 5 and the cable 2 is formed, so that the wire harness 1 shown in FIGS. 1A and 1B is obtained. Further, since a combination procedure of the male connector 9 is included in a conventional technique, here, the explanation is omitted.

As explained above, in the wire harness 1 of the embodiment, the welding member 21 is formed around the cable 2 so as to surround the cable 2 while allowing the gap portion 24 to have a predetermined clearance from the cable 2, and in the process of the ultrasonic welding, the welding member 21 is fitted into the concave portion 5b of the female outer housing 5, and the welding member 21 is vibrated and simultaneously pressed against a side of bottom wall 5c of the concave portion 5b so that the forward end portion of the welding member 21 to be in contact with the bottom wall 5c of the concave portion 5b is melted into a melt resin, the melt resin as a melted part of the welding member 21 is poured into the gap portion 24, and a periphery of the cable 2 is covered with the melt resin.

Namely, the wire harness 1 is constructed such that the melt resin formed by melting the forward end portion of the convex portion 22 of the welding member 21 is introduced into a side of the cable 2, and is poured into the gap portion 24 surrounding the periphery of the cable 2, so that the periphery of the cable 2 is covered with the melt resin.

Thus, the melt resin can be almost uniformly poured into the periphery of the cable 2, namely, the melt resin layer surrounding the periphery of the cable 2 can be formed so as to have an approximately uniform thickness, and the periphery of the cable 2 is covered with the melt resin with no space, and the female outer housing 5 and the welding member 21 are integrated with each other with no space, so that the air-tightness between the female outer housing 5 and the cable 2 can be sufficiently maintained.

In addition, the wire harness 1 is configured to have a structure that the convex portion 22 of the welding member 21 is formed to have a taper shape that tapers toward the forward end, consequently, at the time of the ultrasonic welding, an area of the convex portion 22 coming into contact with the bottom wall 5c of the concave portion 5b of the female outer housing 5 is decreased and vibration can be concentrated on the forward end portion of the convex portion 22 so that the forward end portion of the convex portion 22 can be easily melted. Since the periphery of the convex portion 22 is adhered to the female outer housing 5, the melt resin that is the melted forward end portion of the convex portion 22 is introduced into a side of the cable 2. Namely, by allowing the forward end portion of the convex portion 22 to be easily melted, the melt resin can be easily poured into the gap portion 24.

In addition, the wire harness 1 is configured to have a structure that the convex portion 22 of the welding member 21 is formed to have such a length that an amount of the melt resin melted at the ultrasonic welding becomes large to such an extent that the gap portion 24 is perfectly filled and the melt resin poured into the gap portion 24 presses the cable 2 due to pressing force at the time of the ultrasonic welding. Due to this, the sheath 2b of the cable 2 is pressed by the melt resin poured into the gap portion 24 at the time of the ultrasonic welding, so that the air-tightness can be further enhanced.

In addition, the wire harness 1 is configured to have a structure that the convex portions 22 adjacent to each other are formed to be stacked on each other so as to share a part thereof with each other, so that a distance between the cables 2 can be decreased and a pitch of the cable 2 can be further shortened.

In addition, the wire harness 1 is configured to have a structure that the female outer housing 5 and the welding member 21 are formed of the same resin material, so that the female outer housing 5 and the welding member 21 can be firmly integrated with each other due to the ultrasonic welding.

In the above-mentioned embodiment, a case that the gap portion 24 is perfectly filled with the melt resin has been explained, but the invention is not limited to this, a case that the gap portion 24 is not perfectly filled with the melt resin and there is some space is also included in the scope of technical idea of the invention.

In addition, in the above-mentioned embodiment, the air-tightness maintaining structure between the female outer housing 5 in the female connector 6 and the cable 2 has been explained, but the invention is not limited to this, the invention can be also applied to an air-tightness maintaining structure between the male outer housing 8 in the male connector 9 and the cable 2 in case that the cable 2 is connected to the male connector 9.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A wire harness, comprising:
    a cable;
    a connector comprising an outer housing comprising a resin, a cable insertion hole into which an end portion of the cable is inserted, and a concave portion formed on an insertion side of the cable insertion hole; and
    a welding member comprising a resin to provide air-tightness between the outer housing and the cable by being welded to the outer housing by ultrasonic welding, the welding member being formed around the cable so as to surround the cable while allowing a gap portion to have a predetermined clearance from the cable, and fitted into the concave portion of the outer housing,
    wherein in a process of the ultrasonic welding, the welding member is fitted into the concave portion of the outer housing, vibrated and simultaneously pressed against a bottom wall side of the concave portion such that a forward end portion of the welding member in contact with the bottom wall side of the concave portion is melted into a melt resin, the melt resin is poured into the gap portion, and a periphery of the cable is covered with the melt resin.

2. The wire harness according to claim 1, wherein the welding member further comprises a convex portion to be fitted into the concave portion of the outer housing and a flange part integrally formed on a rear end side of the convex portion to be in contact with a peripheral edge of the concave portion in the process of the ultrasonic welding, and the convex portion is formed longer than a depth of the concave portion of the outer housing.

3. The wire harness according to claim 2, wherein the convex portion of the welding member comprises a taper shape that tapers toward the forward end such that an area of the convex portion to be in contact with the bottom wall side of the concave portion of the outer housing is decreased in the process of the ultrasonic welding.

4. The wire harness according to claim 2, wherein the flange part is formed to adhere to the cable so as to prevent the melt resin from being leaked from between the flange part and the cable, the convex portion is formed around the cable so as to surround the cable while allowing the gap portion to have the predetermined clearance from the cable, and the convex portion is formed to have such a length that an amount of the melt resin melted by the ultrasonic welding becomes such that the gap portion is perfectly filled and the melt resin poured into the gap portion presses the cable by being pressed in the process of the ultrasonic welding.

5. The wire harness according to claim 2, wherein a plurality of cables are included, the convex portion is formed cylindrical and has an inner diameter greater than an outer diameter of the cable and the convex portion is provided for each of the plurality of cables, and the convex portion is formed to share a part thereof with an adjacent convex portion.

6. The wire harness according to claim 1, wherein the outer housing and the welding member are formed of a same resin material.

7. A method of manufacturing a wire harness comprising: a cable; a connector comprising an outer housing comprising a resin, a cable insertion hole into which an end portion of the cable is inserted, and a concave portion formed on an insertion side of the cable insertion hole; and a welding member comprising a resin to provide air-tightness between the outer housing and the cable by being welded to the outer housing by ultrasonic welding, the welding member being formed around the cable so as to surround the cable while allowing a gap portion to have a predetermined clearance from the cable, and fitted into the concave portion of the outer housing,
    the method comprising:
    inserting the cable into the welding member;
    fitting the welding member into the concave portion of the outer housing; and
    vibrating the welding member and simultaneously pressing the welding member against a bottom wall side of the concave portion so as to melt into a melt resin a forward end portion of the welding member in contact with the bottom wall side of the concave portion, pour the melt resin into the gap portion, and cover a periphery of the cable with the melt resin.

* * * * *